United States Patent

[11] 3,602,055

[72] Inventors Gilbert K. Hause
Bloomfield Hills;
Jerry R. Mrlik, Birmingham, both of, Mich.
[21] Appl. No. 15,647
[22] Filed Mar. 2, 1970
[45] Patented Aug. 31, 1971
[73] Assignee General Motors Corporation
Detroit, Mich.

[54] TRANSMISSION
3 Claims, 3 Drawing Figs.

[52] U.S. Cl. ................................... 74/759,
74/753, 74/763
[51] Int. Cl. .................................... F16h 57/10,
F16h 5/18
[50] Field of Search ................................ 74/759,
763, 767, 753, 761, 765

[56] References Cited
UNITED STATES PATENTS

| | | | |
|---|---|---|---|
| 2,395,459 | 2/1946 | Carnagua | 74/761 X |
| 2,418,378 | 4/1947 | Voytech | 74/761 |
| 2,531,996 | 11/1950 | Voytech | 74/759 X |
| 2,620,685 | 12/1952 | Smirl | 74/759 X |
| 3,049,945 | 8/1962 | Lindsay | 74/759 |
| 3,209,620 | 10/1965 | Moan | 74/761 X |
| 3,505,905 | 4/1970 | Lepelletier | 74/759 X |

Primary Examiner—Carlton R. Croyle
Assistant Examiner—Thomas C. Perry
Attorneys—W. E. Finken, A. M. Heiter and R. L. Phillips ABSTRACT: A vehicle transmission having a hydrodynamic torque converter and planetary gearing combined with four friction brakes, three friction clutches and three one-way devices to provide four forward drives including an overdrive and also to provide a reverse drive.

PATENTED AUG 31 1971 3,602,055

INVENTORS
Gilbert K. Hause, &
BY Jerry R. Mrlik
Ronald L. Phillips
ATTORNEY ure to engage clutch 32 and thus connect converter output shaft 20 to shaft 38. A release spring 41 biases piston 39 towards its clutch release position.

TRANSMISSION

This invention relates to transmissions and more particularly to vehicle transmissions affording a plurality of drives including an overdrive.

It is well known that a vehicle transmission with a plurality of drives including overdrive is desirable for economical vehicle operation. From an operational standpoint it is also desirable that such a transmission have no friction drive engagement overlap or power flow interruption. From both an operational and cost standpoint it is desirable that the drives be afforded with simple gearing and a minimum number of friction drive establishing devices.

The present invention is embodied in a transmission generally comprising a hydrodynamic torque converter and two simple planetary gearsets. One of the gearsets is located at the rear of the transmission and the other gearset is located toward the front. The gearsets are combined with drive-establishing devices to provide four forward drives and a reverse drive. For the first and lowest speed range forward drive, a first friction clutch is engaged to connect the converter output through a first one-way clutch to drive the sun gear of the front gearset. This sun gear meshes with a planet pinion which is carried by a carrier that is connected to the ring gear of the rear gearset. The pinion in the front gearset also meshes with a ring gear which is connected to the carrier of the rear gearset, this ring gear and carrier being connected to the transmission output. The planet pinion carried by the carrier of the rear gearset meshes with the ring gear of this gearset and also with a sun gear which is held against backward rotation in this lowest drive by a one-way brake with engagement of a first friction brake. Thus, the lowest forward speed range drive is provided by compound action of the two gearsets driving the transmission output in the same direction as the converter output but at a reduced speed, this direction being the forward direction. For engine braking in this drive, a second friction brake is engaged to hold the sun gear in the rear gearset against forward rotation and a second friction clutch is also engaged so that this clutch and a second one-way clutch whose action is opposite that of the first one-way clutch provide for drive from the sun gear of the front gearset to the converter.

For the second forward drive, the previously engaged first brake remains engaged, the first clutch may remain engaged and a third friction clutch is engaged to provide a drive connection between the converter output and the ring gear of the rear gearset. With the sun gear in the rear gearset held against backward rotation, the transmission output is driven in the forward direction in a higher speed range by the reduction ratio thus afforded by the rear gearset. For engine braking in this drive, the second brake is engaged to hold the sun gear in the rear gearset against forward rotation.

The third forward drive is provided by maintaining engagement of both the first clutch and third clutch and engaging the second clutch. This locks up the front gear set to provide a 1:1 speed ratio drive between the converter output and the transmission output with engine braking made available by this drive arrangement. The first brake may remain engaged in the latter drive since the one-way brake permits the sun gear in the thus locked up rear gearset to freewheel in the forward direction.

The fourth and highest speed range drive is an overdrive and is provided by maintaining engagement of both the second clutch and third clutch, disengaging the first clutch and then engaging a third friction brake to hold the sun gear in the front gearset. The second one-way clutch prevents runaway of the sun gear in the front gearset during this upshift and the second clutch may remain engaged since the second one-way clutch will freewheel after this shift. With the sun gear in the front gearset thus held and the carrier in this gearset driven in the forward direction, the ring gear in this gearset and thus the transmission output are driven in the forward direction at a higher speed by the overdrive ratio thus afforded by the front gearset. In the fourth forward drive, the first brake may remain engaged since the sun gear in the rear gearset is rotated in the forward direction in this drive and such sun gear rotation is permitted by the one-way brake. Engine braking is made available in overdrive since the sun gear in the front gearset is prevented from rotating in the reverse direction.

The reverse drive is provided by engaging the first clutch that provides for one-way clutch drive to the sun gear of the front gearset and engaging a fourth friction brake that holds the carrier of this gearset. The front gearset then drives the transmission output in reverse at reduced speed.

An object of the present invention is to provide a new and improved transmission.

Another object is to provide in a transmission, planetary gearing having both a carrier and a ring gear connected to the transmission output, a connected ring gear and carrier which may be input driven, a reaction sun gear and another sun gear which may be either input driven or held to provide forward drives including overdrive and also to provide a reverse drive with no friction drive engagement overlap or power flow interruption during shifting between all of the forward drives.

Another object is to provide a transmission having planetary gearing combined with four brakes, three clutches and three one-way devices to provide four forward drives and also to provide a reverse drive with no friction drive engagement overlap or power flow interruption during shifting between all the forward drives and with engine braking available in all forward drives.

These and other objects of the invention will be more apparent from the following description and drawing in which.

Figure 1:
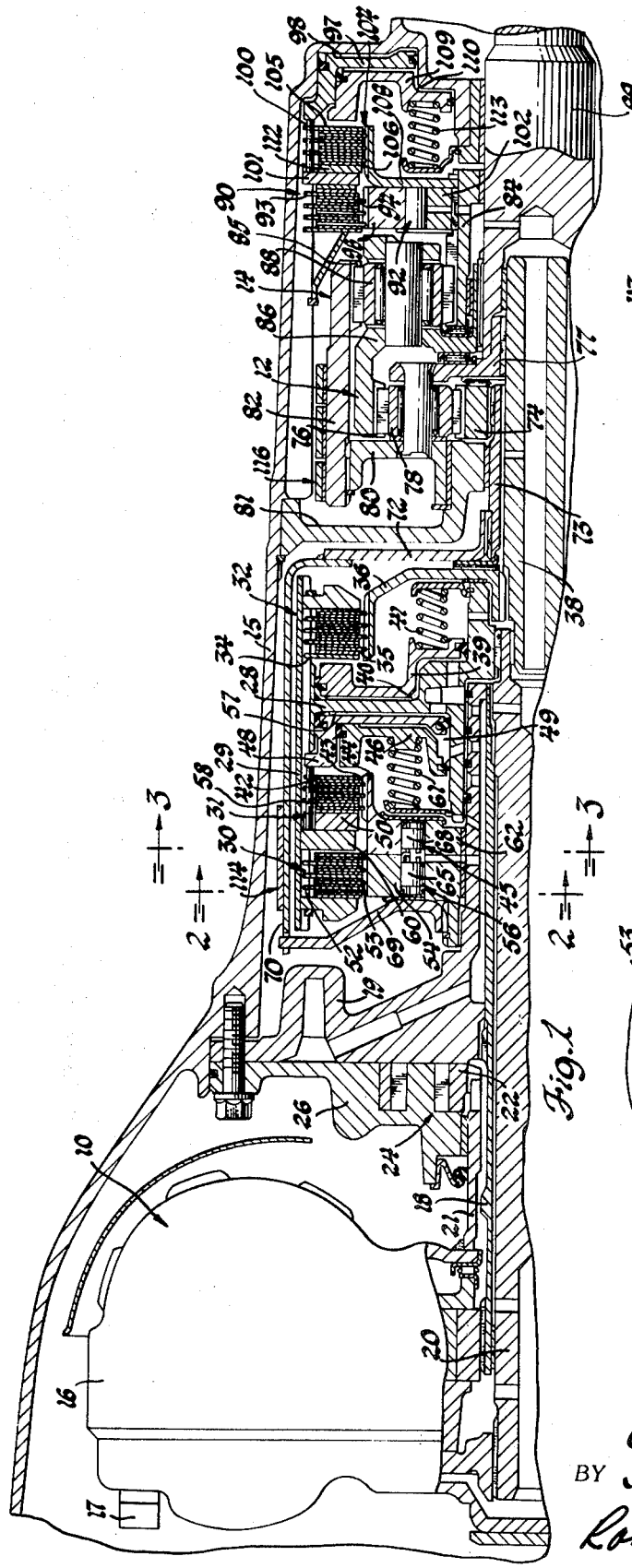
FIG. 1 is a longitudinal sectional view of the preferred embodiment of the transmission according to the present invention.

In the drawing there is shown a vehicle transmission generally comprising a hydrodynamic torque converter 10, planetary gearsets 12 and 14 and a plurality of drive-establishing devices all housed in a transmission housing 15. The transmission is operable to provide four forward drives, neutral and a reverse drive. The forward drives are provided by two gear reduction drives, a direct drive and a geared overdrive.

Describing now the structural details, rotary housing 16 of converter 10 has lugs 17 for connecting a vehicle's engine to drive the converter. The hydrodynamic torque converter 10 is of a conventional three-element type with reaction for torque multiplication being taken through a sleeve 18 which is splined to a front bulkhead 19 that is bolted to the transmission housing 15. Output from converter 10 is delivered by a converter output shaft 20 which rotates in what will be described as the forward direction. The rotary converter housing 16 is connected by a sleeve 21 to drive a pump drive gear 22 of an internal-external gear pump 24 whose housing 26 is secured to the front side of the front bulkhead 19 by the bulkhead's securing bolts. The pump 24 is for delivering fluid under pressure to operate the transmission's control system.

Converter output shaft 20 which serves as the input shaft to the planetary gearing is splined at its rear end to a hub 28 of a clutch drum 29 in which is located three friction clutches indicated generally at 30, 31 and 32. Clutch 32 comprises drive plates 34 which are connected by splines to drum 29 and are adapted to engage driven plates 35. Driven plates 35 are connected by splines to a clutch hub 36 that is splined to the front end of a shaft 38. A piston 39 forms with the rear side of hub 28 a chamber 40 that is adapted to receive fluid under pressure to engage clutch 32 and thus connect converter output shaft 20 to shaft 38. A release spring 41 biases piston 39 towards its clutch release position.

The clutch 31 comprises drive plates 42 which are connected by splines to drum 29 and are adapted to engage driven plates 43. Driven plates 43 are connected by splines to the outer race 44 of a one-way clutch 45 whose structure will be described in more detail later. A piston 46 forms with clutch hub 28 and another piston 48 a chamber 49 that is adapted to receive fluid under pressure to engage clutch 31 and thus connect converter output shaft 20 to outer race 44 of the one-way clutch 45. The reaction for this clutch engagement is taken by a plate 50 that is secured to drum 29.

The clutch 30 comprises drive plates 52 which are connected by splines to the drum 29 and are adapted to engage driven plates 53. Driven plates 53 are connected by splines to the outer race 54 of a one-way clutch 56 whose structure is described in more detail later. The piston 48 forms with the front side of clutch hub 28 a chamber 57 that is adapted to receive fluid under pressure to engage clutch 30, the force from piston 48 to the clutch plates 52 and 53 being transmitted via an extension 58 to pressure plate 60 of this clutch. Movement of piston 48 also causes movement of piston 46 but such latter movement is not sufficient to cause engagement of clutch 31 while clutch 30 is being engaged. A spring 61 biases both pistons 46 and 48 towards their clutch release positions.

Figure 3:
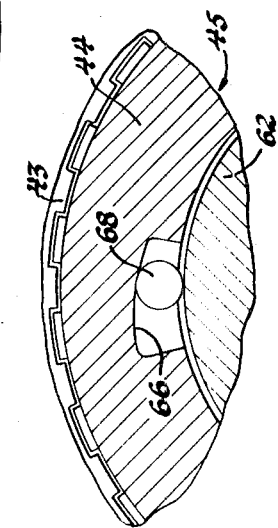
FIG. 3 is a view taken on line 3—3 in FIG. 1.
Figure 2:
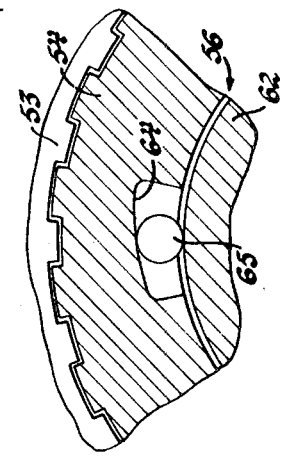
FIG. 2 is a view taken on line 2—2 in FIG. 1.

The two one-way clutches 45 and 56 have a common inner race 62 and may be of any suitable conventional type such as the roller type shown. The one-way clutch 56 has an outer profile 64 as shown in FIG. 2 so that its rollers 65 permit forward or clockwise rotation of inner race 62 relative to outer race 54 as viewed in FIG. 2 and prevent reverse rotation relative thereto. The other one-way clutch 45 has an outer race profile 66 as shown in FIG. 3 so that its one-way clutching action is the opposite of one-way clutch 56 in that its rollers 68 prevent forward or clockwise rotation of inner race 62 relative to outer race 44 as viewed in FIG. 3 and permit free reverse rotation relative thereto. The inner race 62 of one-way clutches 45 and 56 is splined at its front end to a front plate 69 that is connected at its outer radius by splines to a drum 70. Drum 70 surrounds drum 29 and is welded at its rear end to a rear plate 72 that is splined to a sleeve shaft 73 surrounding shaft 38.

In the planetary gearing, the gearset 14 is located at the rear of the transmission and the other gearset 12 is located forward of the former gearset. Both gearsets 12 and 14 are of the simple helical planetary gear type. The front gear set 12 comprises an annular sun gear 74, a ring gear 76 and a planet carrier 77 carrying a planet pinion 78 in mesh with sun gear 74 and ring gear 76. The sun gear 74 is splined to the rear end of shaft 73. The carrier 77 is splined to the rear end of shaft 38 and has a front plate 80 which is supported for rotation on a boss of a rear bulkhead 81 which is secured to the transmission housing 15. The plate 80 of carrier 77 is connected at its outer radius by splines to a drum 82. The rear gearset 14 comprises an annular sun gear 84, a ring gear 85 and a planet carrier 86 having a planet pinion 88 in mesh with sun gear 84 and ring gear 85. The ring gear 85 of the rear gearset is formed integral with drum 82 and is thus connected to carrier 77 of the front gearset. The ring gear 76 of the front gearset is formed integral with carrier 86 of the rear gearset 14 and this carrier and thus ring gear 76 is connected by splines to a shaft 89. Shaft 89 is rotatably supported in the rear end of the transmission housing 15 as shown and serves as the transmission's output. The ring gear 76 of the front gearset is formed integral with carrier 86 of the rear gearset and thus the ring gear 76, carrier 86 and output shaft 89 are all connected.

A friction brake 90 and a one-way brake 92 are for selectively holding the sun gear 84 of the rear gearset 14 against backward rotation. The brake 90 comprises plates 93 which are connected by splines to the transmission housing 15 and are adapted to engage plates 94 that are connected by splines to the outer race 96 of one-way brake 92. A piston 97 forms with the rear end of transmission housing 15 a chamber 98 that is adapted to receive fluid under pressure to engage brake 90, the force from piston 97 to brake plates 93 and 94 being transmitted via an extension 100 to pressure plate 101 of this clutch. The one-way brake 92 may be of any suitable conventional type such as the roller type shown and has its inner race 102 splined to sun gear 84 of the rear gearset 14. The one-way brake 92 has a directional sense like one-way clutch 56 so that when brake 90 is engaged, the one-way brake 92 is then operable to prevent reverse rotation of sun gear 84 and permit free forward rotation thereof.

In addition to the selective prevention of reverse rotation of sun gear 84, there is provided a friction brake 104 which prevents any rotation thereof. The brake 104 comprises plates 105 which are connected by splines to the transmission housing 15 and are adapted to engage plates 106 that are connected by splines to a brake hub 108 that is splined to sun gear 84. A piston 109 forms with piston 97 and the rear end of transmission housing 15 a chamber 110 that is adapted to receive fluid under pressure to engage brake 104, reaction for this braking action being taken by a reaction plate 112 that is secured to the transmission housing. The movement required of piston 97 to engage the brake 90 is small enough so that the piston 109 which travels therewith does not engage brake 104 like in the piston arrangement for clutches 30 and 31. A release spring 113 urges both pistons 109 and 97 toward their brake release positions.

A friction band brake 114 grounded to the transmission housing 15 and operated by any suitable fluid pressure operated servo is adapted to engage drum 70 and thus brake sun gear 74 of the front gearset 12. Another friction band brake 116 grounded to the transmission housing 15 and operated by any suitable fluid pressure operated servo is adapted to engage drum 82 and thus brake carrier 77 of the front gearset 12.

The friction drive establishing clutches and brakes may be actuated by any suitable hydraulic system and in a certain sequence. The following description illustrates the operation available.

For neutral, all of the hydraulically actuated clutches and brakes are released. Thus, no power from the converter output shaft 20 can be transmitted through the gearing to the transmission output shaft 89.

The first and lowest speed range forward drive is established by engaging clutch 30 and brake 90. Power from the forwardly rotating converter output shaft 20 is delivered through the engaged clutch 30 and one-way clutch 56 to drive sun gear 74 forwardly. The other sun gear 84 tries to rotate backwardly but is prevented from doing so by one-way brake 92 since brake 90 is engaged. The gearing, then, by compound action drives the output shaft 89 in the forward direction and at a reduced speed relative to the converter output shaft 20. Since one-way clutch 30 permits forward rotation of sun gear 74 relative to the converter output shaft 20 and the one-way brake 92 permits forward rotation of the other sun gear 84, power cannot be transmitted from the output shaft 89 to the converter 10 for engine braking and thus the transmission output shaft can overrun when the vehicle is coasting. In the first forward drive, the clutch 31 may be engaged so that the one-way clutch 45 provides for forward rotational drive from sun gear 74 to converter output shaft 20 and in addition, the brake 104 is then engaged to prevent forward rotation of the other sun gear 84 whereby power can now be transmitted from the transmission output to the transmission input for engine braking.

The second and next higher speed range drive is established by maintaining engagement of brake 90, releasing brake 104 and clutch 31 if they are engaged and engaging clutch 32. Input power is now delivered through the engaged clutch 32 to drive ring gear 85 forwardly. The sun gear 84 tries to rotate backwardly but is prevented from doing so by the one-way brake 92 since brake 90 is engaged. Planet pinion 88 therefore walks forwardly around the interior of ring gear 85 and drives carrier 86 and connected output shaft 89 forwardly at a reduced speed but is a speed range higher than that in the first forward drive. In the second forward drive the carrier 77 in the front gearset rotates at input speed in the forward direction and the ring gear 76 also rotates in the forward direction but at a reduced speed. Thus, the sun gear 74 rotates in the forward direction at a speed faster than input speed and therefore the clutch 30 may remain engaged on the shift to the second forward drive since the one-way clutch 56 permits forward rotation of sun gear 74 relative to converter output shaft 20. Since one-way brake 92 permits forward rotation of sun gear 84, power cannot be transmitted from the transmission output to the converter for engine braking. In the second forward drive, the brake 104 may be engaged to prevent forward rotation of sun gear 84 to provide for engine braking.

The third and next higher speed range drive is established by maintaining engagement of the clutches 30 and 32, releasing brake 104 if it is engaged and engaging clutch 31. Thus, carrier 77 in the front gearset continues to be driven in the forward direction at input speed. With both clutches 30 and 31 engaged, the one-way clutches 45 and 56 provide opposite one-way clutching action to effect a positive connection between the converter output shaft 20 and sun gear 74 in the front gearset. Since the carrier 77 and sun gear 74 are thus caused to rotate in the forward direction at the same speed, the front gearset 12 is locked up and therefore provides a 1:1 speed ratio on direct drive between the converter output shaft 20 and transmission output shaft 89. In the third forward drive, the rear gearset 14 is also locked up and therefore the sun gear 84 in this gearset also rotates in the forward direction at input speed. Thus, the brake 90 may remain engaged on the shift to the third forward drive since the one-way brake 92 permits forward rotation of sun gear 84. With the gearing thus locked up, engine braking is made available in this drive.

The fourth and highest speed range drive is established by maintaining engagement of clutches 31 and 32, releasing clutch 30 and thereafter engaging brake 114. As clutch 30 is released, the drive through engaged clutch 32 tries to increase the forward speed of sun gear 74 in the front gearset. On this occurrence, the one-way clutch 45 engages since clutch 31 is engaged so that sun gear 74 is prevented from speeding up in the forward direction relative to converter output shaft 20. Then the brake 114 is engaged with power interruption thus having been prevented on the shift. Power thus remains applied to drive carrier 77 in the forward direction at input speed but now with sun gear 74 prevented from rotation by brake 114, the ring gear 76 and connected transmission output shaft 89 are driven in the forward direction at a speed higher than input speed. In the fourth forward drive, the clutch 31 may remain engaged since the one-way clutch 45 will permit the converter output shaft 20 to rotate forwardly relative to the then held sun gear 74. Additionally, the brake 90 may remain engaged on the shift to fourth forward drive since the one-way brake 92 will permit the forward rotation of sun gear 84 that occurs in this drive. With the positive connection provided by clutch 32 and the two-way braking provided by brake 114 in the fourth forward drive, engine braking is thus made available in this overdrive.

The above sequential operation demonstrates how upshifts are effected without any friction drive engagement overlap or power flow interruption. Downshifts are effected by reversing this order of operation and are thus also effected without friction drive engagement overlap or power flow interruption.

Reverse drive is obtained by engaging clutch 30 and brake 116, with carrier 77 thus held and sun gear 74 driven in the forward direction through clutch 30 and one-way clutch 56, the ring gear 76 and thus output shaft 89 are driven in the reverse direction at reduced speed.

The four forward drives and one reverse drive thus made available make the transmission particularly suitable for use in a passenger car with the fourth forward drive, which is overdrive, providing for economical vehicle cruising. Furthermore, this transmission arrangement, with its simple gearing and the one-way drive establishing devices which control upshifts and downshifts, permits a wide range of transmission operations to cover fully automatic and also manual transmission range operation and with a minimum number of friction drive establishing devices thereby providing a simple and low-cost transmission well suited for mass production.

The above-described preferred embodiment is illustrative of the invention which may be modified within the scope of the appended claims.

We claim:

1. In a transmission the combination of an input member; an output member; first and second planetary gear sets each having a sun gear, a ring gear and a carrier supporting a pinion in mesh with the sun gear and ring gear; the ring gear of said first gearset, the carrier of said second gearset and said output member all being connected; the carrier of said first gearset connected to the ring gear of said second gearset; means including first clutch means and first one-way clutch means in series therewith for selectively providing a one-way drive connection between said input member and the sun gear of said first gearset; means including second clutch means and second one-way clutch means in series therewith whose one-way action is opposite that of said first one-way clutch means for selectively providing another one-way drive connection between said input member and the sun gear of said first gearset; third clutch means for selectively connecting said input member to the carrier of said first gearset and connected ring gear of said second gearset; drive establishing means including first brake means for selectively preventing rotation of the sun gear of said second gearset in at least one direction; second brake means for selectively braking the sun gear of said first gearset and third brake means for selectively braking the carrier of said first gearset whereby a first forward speed range drive is provided on engagement of said first clutch means and said first brake means, a second forward speed range drive is provided on engagement of said third clutch means and said first brake means while said first clutch means is engaged, a third forward speed range drive is provided on engagement of said first, second and third clutch means while said first brake means is engaged, a fourth forward speed range drive is provided on engagement of said second brake means and said third clutch means while both said second clutch means and said first brake means are engaged and a reverse speed range drive is provided on engagement of said first clutch means and said third brake means.

2. The transmission set forth in claim 1 and said drive establishing means including one-way brake means in series with said first brake means.

3. The transmission set forth in claim 2 and fourth brake means for selectively holding the sun gear of said second gearset against rotation in any direction in both said first and second forward speed range drives.